United States Patent
Mason

(10) Patent No.: US 10,410,364 B2
(45) Date of Patent: *Sep. 10, 2019

(54) APPARATUS AND METHOD FOR GENERATING VIRTUAL REALITY CONTENT

(71) Applicant: NBCUniversal Media, LLC, New York, NY (US)

(72) Inventor: Thomas Bause Mason, Brooklyn, NY (US)

(73) Assignee: NBCUniversal Media, LLC, New York, NY (US)

( * ) Notice: Subject to any disclaimer, the term of this patent is extended or adjusted under 35 U.S.C. 154(b) by 65 days.

This patent is subject to a terminal disclaimer.

(21) Appl. No.: 15/716,352

(22) Filed: Sep. 26, 2017

(65) Prior Publication Data
US 2018/0025504 A1    Jan. 25, 2018

Related U.S. Application Data

(63) Continuation of application No. 14/585,034, filed on Dec. 29, 2014, now Pat. No. 9,811,911.

(51) Int. Cl.
*G06T 7/50* (2017.01)
*G06T 7/70* (2017.01)
(Continued)

(52) U.S. Cl.
CPC ............... *G06T 7/50* (2017.01); *G06F 16/00* (2019.01); *G06F 16/40* (2019.01); *G06F 16/444* (2019.01);
(Continued)

(58) Field of Classification Search
CPC .......... G06K 9/00671; G06K 9/00624; G06K 2009/00738; G06K 5/00; G06K 9/00006; G06K 9/00228; G06K 9/00255; G06K 9/00369; G06K 9/00664; G06K 9/3216; G06K 9/4652; G06K 9/6212; G06F 3/011; G06F 3/147; G06F 3/012; G06F 3/013; G06F 3/04842
See application file for complete search history.

(56) References Cited

U.S. PATENT DOCUMENTS

| | | | | |
|---|---|---|---|---|
| 2011/0129118 A1* | 6/2011 | Hagbi | ................... | G06T 19/006 382/103 |
| 2013/0281209 A1* | 10/2013 | Lyons | ................. | G07F 17/3211 463/33 |

(Continued)

*Primary Examiner* — Devona E Faulk
*Assistant Examiner* — Ming Wu
(74) *Attorney, Agent, or Firm* — Lee, Hong, Degerman, Kang & Waimey PC

(57) ABSTRACT

A method for generating virtual reality (VR) content includes obtaining source information from original media content, retrieving characteristic information stored in a first memory based on the obtained source information wherein the retrieved characteristic information related to the original media content, generating the VR content by combining the retrieved characteristics information and the obtained source information, wherein at least one feature of the retrieved characteristic information is mapped to a corresponding at least one feature of the obtained source information, and outputting the generated VR content and the original media content to be reproduced to a viewer.

22 Claims, 4 Drawing Sheets

(51) Int. Cl.
  *G06F 16/00* (2019.01)
  *G06F 16/40* (2019.01)
  *G06F 16/44* (2019.01)
  *G06T 19/00* (2011.01)
  *G06F 16/954* (2019.01)

(52) U.S. Cl.
  CPC .............. *G06F 16/954* (2019.01); *G06T 7/70* (2017.01); *G06T 19/006* (2013.01)

(56) References Cited

U.S. PATENT DOCUMENTS

| | | | | |
|---|---|---|---|---|
| 2014/0132629 | A1* | 5/2014 | Pandey | G02B 27/0172 345/633 |
| 2014/0210857 | A1* | 7/2014 | Liu | G06T 19/006 345/633 |
| 2014/0225985 | A1* | 8/2014 | Klusza | H04N 13/271 348/43 |
| 2014/0253743 | A1* | 9/2014 | Loxam | H04N 5/232 348/207.1 |
| 2014/0267399 | A1* | 9/2014 | Zamer | H04L 67/20 345/633 |
| 2014/0376728 | A1* | 12/2014 | Ramo | G06T 19/006 381/56 |

* cited by examiner

APPARATUS AND METHOD FOR GENERATING VIRTUAL REALITY CONTENT

CROSS-REFERENCE TO RELATED APPLICATIONS

This application is a continuation of U.S. patent application Ser. No. 14/585,034, filed on Dec. 29, 2014, now U.S. Pat. No. 9,811,911, the contents of which are hereby incorporated by reference herein in its entirety.

Virtual Reality (VR) content provides an enhanced viewing experience for a user by conveying the feeling of being immersed within an environment. Most VR systems enhance the experience by providing the user with the ability to change the user's viewpoint within the content or with respect to various elements of the content, and the environment, characters, and objects within the content may be presented to have a three-dimensional (3D) effect.

However, the creation of VR content typically involves advance planning and complex procedures during the content creation process in order to capture all of the information required to implement a VR experience of the content.

For example, some VR content creation procedures include scanning the entire 360 degree environment of a scene to capture imagery and audio simultaneously to store sufficient information to present a VR experience from various and multiple angles for a user. Even in most non-VR implementations, the creation of 3D content from a single angle typically requires that the content be created with the intention of implementing the content in 3D, such as by using a dual lens 3D dedicated camera, in order to capture all required information during the content creation process in order to achieve the best results.

Therefore, the ability for content creators and providers to dynamically craft and create VR content from existing two-dimensional (2D) and 3D content without the benefit of preplanned and intentionally captured VR information during creation of the original content may be advantageous. Thus, there is a great need for a solution to effectively generate VR information from existing content.

SUMMARY

Embodiments of the present disclosure include a system and method for generating VR content based on original non-VR content, where particular features of the original content are identified and used to retrieve stored information to generate the VR content. In some embodiments, the original content is 2D or 3D content, and the VR content is generated based on the original content and additional stored information related to the original content. In some embodiments, the additional stored information is 2D content or 3D content related to the identified particular features of the original content. In some embodiments, the stored information is retrieved based on the identified particular features.

In some embodiments, the identified particular features of the original content include audio, video, or text of the original content. Embodiments of the present disclosure includes wherein the stored information includes multiple images of an identified particular feature of the original content, and the multiple images are used to generate VR content of the identified particular feature.

According to an embodiment of the present disclosure, stored information related to a recognized object within the original content is searched and retrieved. In this embodiment, the retrieved stored information includes 2D images of the recognized object or may include 3D content of the recognized object. The stored information may be associated with an image related to the original content, audio of the original content, or text of the original content. The embodiment may further include generating VR content based on the retrieved stored information, and may further include storing the generated VR content to be associated with audio, video, or text of the recognized object.

An embodiment of a method of the present disclosure includes obtaining source information from original content, retrieving characteristic information stored in a memory, the retrieved characteristic information related to the original content based on the obtained source information, and generating VR content based on the obtained source information and the retrieved characteristic information.

An embodiment of a system of the present disclosure includes at least one controller configured to obtain source information from original content, retrieve characteristic information stored in a memory, the retrieved characteristic information related to the original content based on the obtained source information, and generate VR content based on the obtained source information and the retrieved characteristic information. In some embodiments, the original content may include 2D content or 3D content.

BRIEF DESCRIPTION OF THE DRAWINGS

The above and other aspects and features of the present disclosure will become more apparent upon consideration of the following description of embodiments, taken in conjunction with the accompanying drawing figures.

DETAILED DESCRIPTION

In the following detailed description, reference is made to the accompanying drawing figures which form a part hereof, and which show by way of illustration specific embodiments of the present invention. It is to be understood by those of ordinary skill in this technological field that other embodiments may be utilized, and that structural, electrical, as well as procedural changes may be made without departing from the scope of the present invention. Wherever possible, the same reference numbers will be used throughout the drawings to refer to the same or similar parts.

Embodiments of the present invention relate to a system and method for generating VR content based on original non-VR content, using preexisting information related to identified features of the original content.

Figure 1:
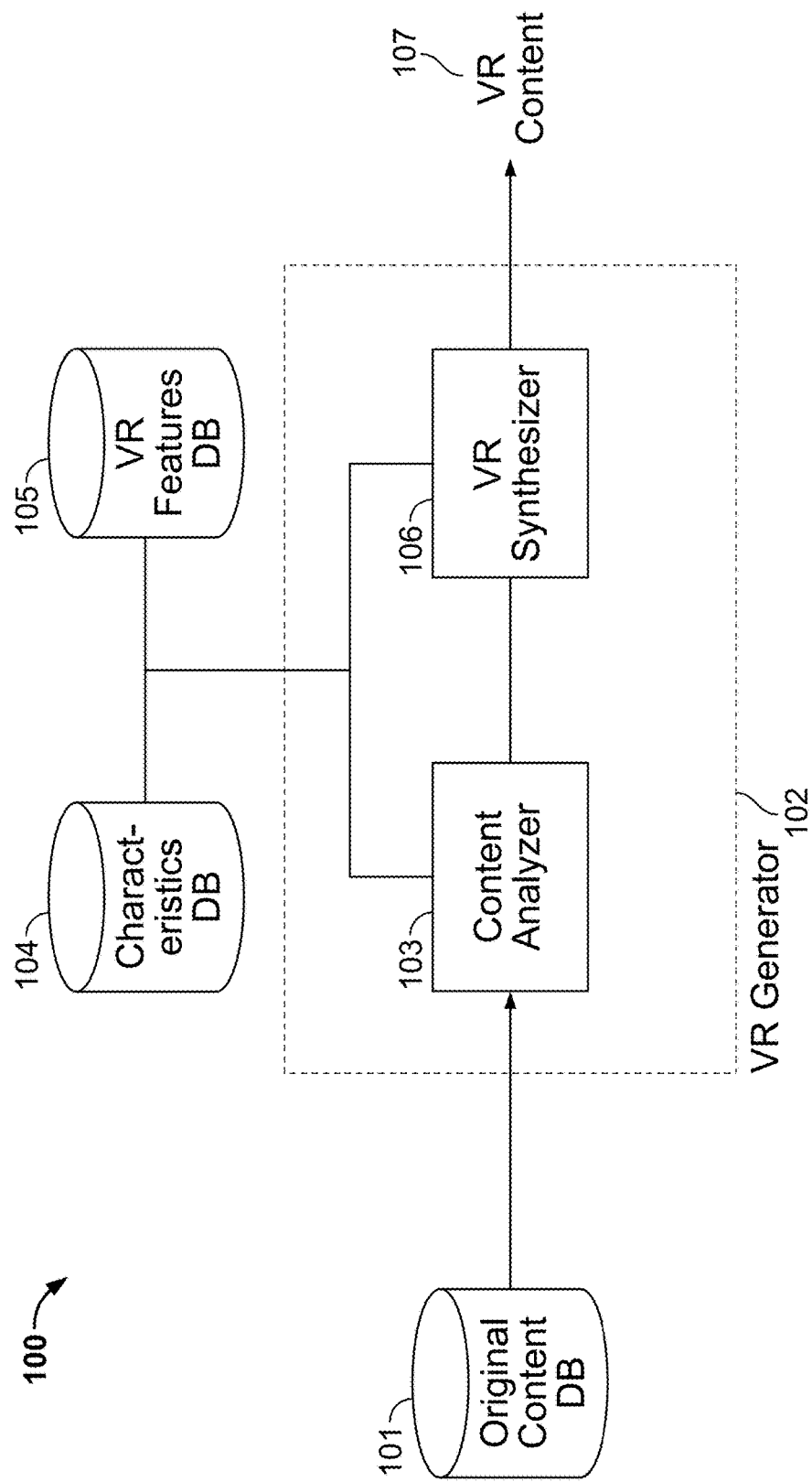
FIG. 1 is an illustration of a system for generating VR content in accordance with an embodiment of the present disclosure.

Referring now to FIG. 1, an embodiment of a system 100 for generating VR content is depicted. The system 100 includes a VR generator 103 for receiving original content from an original content database 101. The original content may include non-VR content such as traditional 2D content, and may also include 3D content which is not implemented as VR content. For example, the original content may include, without limitation, television broadcasts, sporting events, 2D movies, 2D multiview content, 3D movies, online video content, and the like. The embodiment of FIG. 1 depicts the source of the original content represented by a file based database system, however it will be understood by those of ordinary skill in the art that various other content sources may be implemented in the system 100, including non-file based sources such as live television broadcasts, streaming internet content, fixed format content sources, and the like.

The VR generator 103 may include a content analyzer 103 configured to process the original content received from the original content database 101. The content analyzer 103 may be configured to analyze various features of the original content, including object and scene recognition, face detection and recognition, audio and voice recognition, audio and voice detection, voice-to-text analysis, multi-channel audio analysis, graphic text analysis, and the like. The content analyzer 103 may perform the various analysis procedures, discussed in further detail below, and identify various features of the original content, including people, objects, environments, environment conditions, entire scenes, and the like.

Based on features of the original content identified by the content analyzer, 103, additional information related to the identified features may be retrieved from a characteristics database 104. The characteristics database 104 may store various information related to identified people, objects, environments, environment conditions, and the like, and the characteristics database information may be stored to be associated with various metadata, wherein the metadata may correspond to audio, video, images, or text identified in the original content by the content analyzer 103. The stored information may include related video or images of the identified features which may be used to generate a 3D or VR content of the identified feature.

For example, the content analyzer 103 may detect a face of an actor depicted in the original content and perform facial recognition to identify a certain actor. The content analyzer 103 may query the characteristics database 104 with the name of the actor, or other metadata generated by based on the identified actor, to request additional stored information from the characteristics database. The query may include the actor's name, a unique identifier associated with the actor, or other metadata otherwise identifying the actor identified in the scene.

The content analyzer may retrieve additional stored content associated with the identified actor from the characteristics database 104, including video and images of the identified actor from various sides, angles, lighting, distances, and the like. The additional stored content may include any additional content which may contribute to the generation of VR content based on the original content, such as audio and video related to features of the original content. This includes additional content for the generation of VR content which is not included in the original content, such as information required to generate a complete 360 degree view to a viewer.

Figure 4:
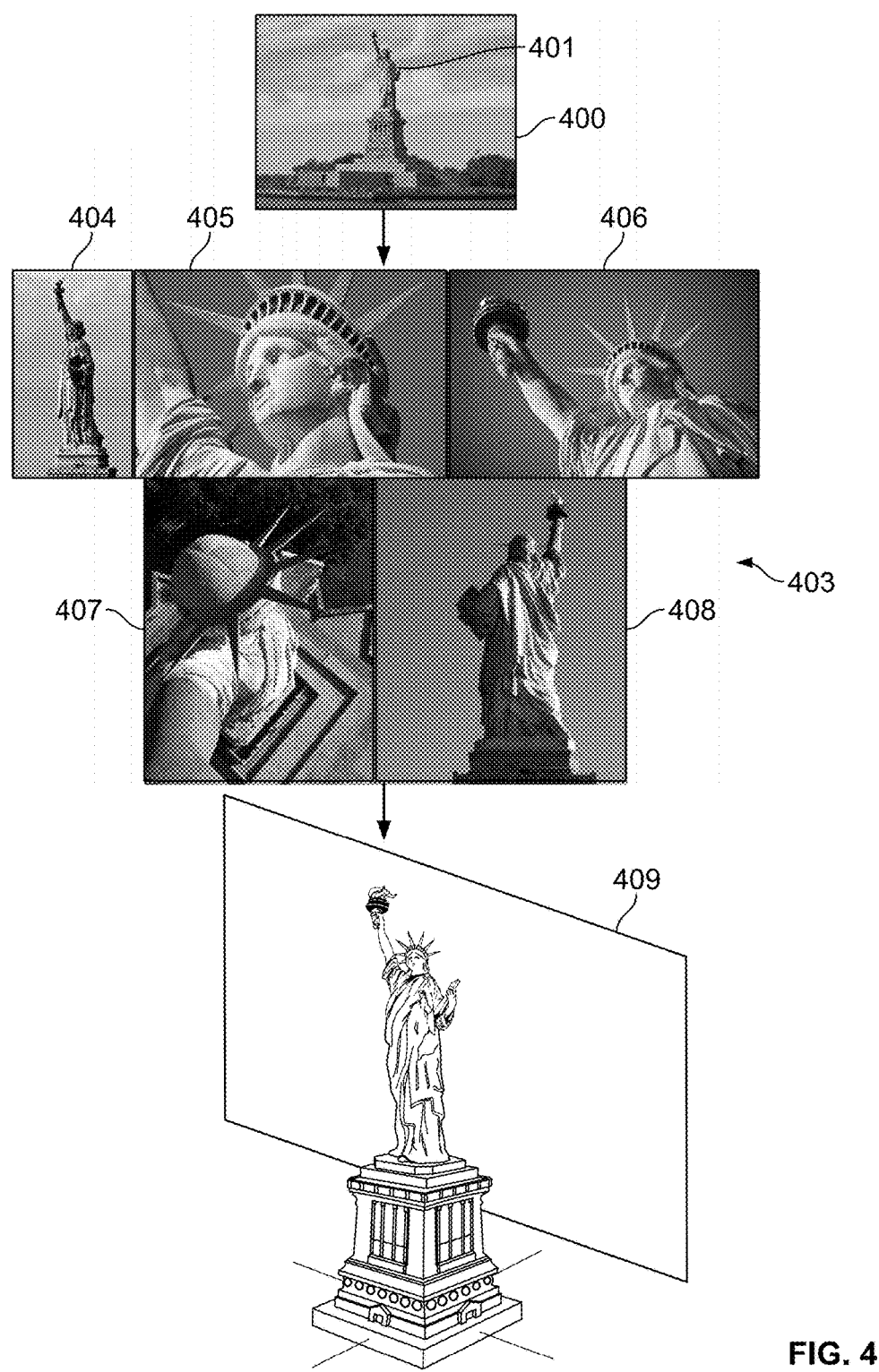
FIG. 4 is an illustration of an example of original source content, additional stored information related to the original content, and generated VR content in accordance with an embodiment of the present disclosure.

In an example shown in FIG. 4, the original content 400 may be a traditional 2D video movie which includes a scene depicting the Statue of Liberty 401. The content analyzer 103 may recognize and identify the landmark depicted in the scene as the Statue of Liberty and generate or obtain metadata associated with the scene of the original content 400. Based on the identified landmark 402 and the obtained metadata, the content analyzer 103 may query the characteristics database 104 to retrieve additional stored information 403 related to the Statue of Liberty to generate VR content.

The additional stored information may include images of the Statue of Liberty from various angles 404, 405, 406, 407, 408, and may also include a 3D video file (not shown) depicting the Statue of Liberty in three dimensions which was created for the generation of another unrelated media content, and stored and tagged with "Statue of Liberty" related metadata in the characteristics database 104. Based on the additional stored information 403 obtained from the characteristics database 104, VR content may be generated which includes a VR representation of the Statue of Liberty 409 based on the information provided by the various angle views and the 3D content of the landmark obtained from the characteristics database 104. In yet another example, and referring back to FIG. 1, the content analyzer 103 may detect and recognize audio of a helicopter in the scene of the original content, however the video of the scene may not include a depiction of the helicopter. Based on the audio of the original content, the content analyzer 103 may identify the presence of a helicopter and query the characteristic database 104 for additional stored information related to helicopters. The additional stored information may then be used, as described further below, to generate VR content in which a depiction of the helicopter is visible when a viewpoint of the user is changed to face the direction of the source of the helicopter audio.

In another embodiment, the characteristics database 104 may include audio information associated with stored metadata. In such embodiment, the content analyzer 103 may query the characteristics database 104 using the helicopter audio from the original content, by using an acoustic fingerprint or other representation of the audio. The characteristics database 104 may provide additional stored information associated with the audio if the query matches stored audio or stored acoustic fingerprints. For example, the additional stored information may include the model of the helicopter identifiable by a distinct rotor sound, and may further include images, 2D video, or 3D video of the particular model of the helicopter to be used for generating the VR content based on the original content.

In other embodiments, the content analyzer 103 may be configured to analyze and recognize various features of the audio or video of the original content, such that the content analyzer 103 may perform recognition processes using other information sources prior to querying the characteristics database 104.

In one embodiment, the system 100 may further include a VR features database 105 which stores previously created VR content. The previously created VR content may be associated with identifying metadata to enable the system 100 to search for and retrieve the previously created VR content. In the previously discussed example involving the Statue of Liberty, the VR features database 105 may include VR content information depicting the Statute of Liberty which was created as VR content during the content creation process, including capturing all environments and objects from numerous viewpoints. Thus, the content analyzer 103 may query the VR features database 105, in addition to the characteristics database 104, to retrieve previously created VR content related to the Statue of Liberty, including individually captured video frame images, and the like.

In another example, the retrieved VR content information from the VR features database 105 may include VR content which was created by the VR content generating system 100 based on original non-VR content, which was stored in the VR features database 105 after being generated. Referring back to the example of FIG. 4, after the generated VR content 409 including the VR representation of the Statue of Liberty is generated, the VR content 409 may be stored in the VR features database 105. The VR content 409 may be stored to be associated with identifying metadata associated with the original content, the scene of the original content, as well as metadata associated with the landmark. Thus, the stored generated VR content 409 may be retrieved for use in later generation of VR content in connection with other and unrelated original content.

Figure 2:
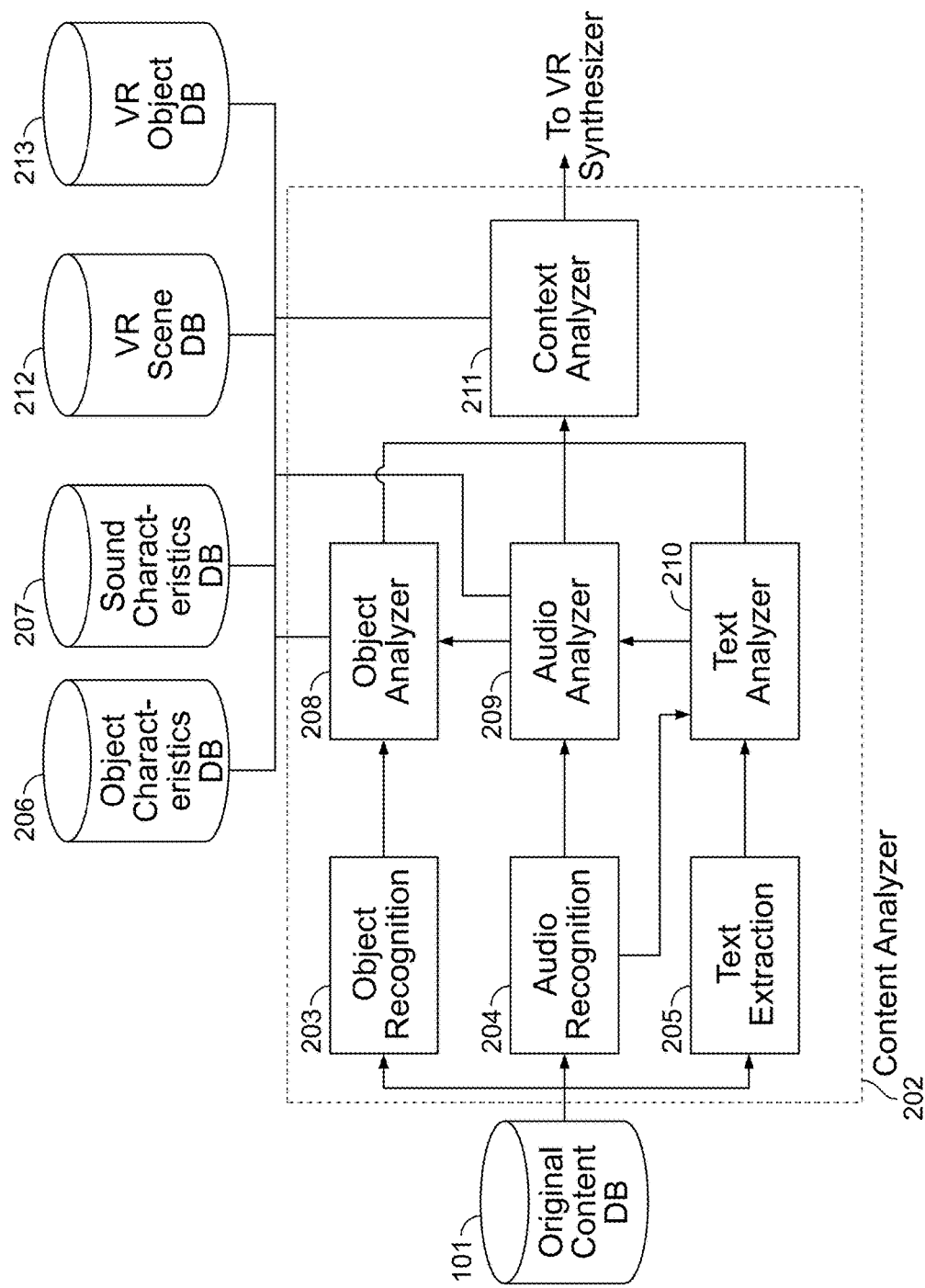
FIG. 2 is an illustration of a content analyzer of the system in accordance with an embodiment of the present disclosure.

In other embodiments, the system may include a VR objects database and a VR scene database (discussed further with reference to FIG. 2). In such embodiments, the VR objects database may be configured to store VR content information related to specific and identified objects which are extracted and may be incorporated into the generation of new VR content. Referring briefly to the example of FIG. 4, information of the VR representation of only the Statue of Liberty extracted from the generated VR content 409 may be stored in the VR objects database.

Additionally, the VR scene database may be configured to store VR content information related to complete scenes which may be used and incorporated into the generation of new VR content. Examples of this include VR scenes which may be implemented for various original content, such as a VR scene of a beach, a VR scene of a waterfall, a VR scene of wildlife, and the like. Referring briefly to the example of FIG. 4, information of the entire VR scene corresponding to the generated VR content 409 may be stored in the VR scene database.

The VR generator 103 may further include a VR synthesizer 106 which receives the analyzed original content, additional information related to the original content retrieved from the characteristics database 104, and additional VR information retrieved from the VR features database 105. The VR synthesizer 106 may be configured to map the additional information to the original content in order to generate VR content 107 based on the original content.

In one example, the VR synthesizer 106 may be configured to generate a 3D surface map of a face or an object included in the original content, and utilize the additional information related to the face or the object retrieved from the characteristics database or the VR features database to generate a full 3D representation of the face or object for generation of the VR content. Other known 3D mapping techniques are considered for generating the VR content based on the original content and the additional stored information, and one of ordinary skill in the art will appreciate that various techniques and methods known and used in the related art may be applied in this aspect of the present disclosure.

The VR synthesizer may further incorporate audio information received from the content analyzer 103, including multi-channel audio to determine a position of an object or character within the generated VR space if the object or character is not depicted in the original content. The audio information may also be used to determine movement of an object or character within the VR space, for example where the VR content is generated to include a helicopter flying from left to right as determined from the directional audio information.

After being generated, the VR content may be provided to another party for distribution or display to a viewer. The VR content may be provided along with the original source content to enable a viewer to select which format is desired for consuming the content. Various embodiments are considered where the viewer is able to switch between a traditional 2D or 3D format of the content or the generated VR content experience.

The generated VR content may also be stored in the VR features database 105 for use in other VR content generation processes. In some embodiments, separate VR information may be stored in the VR objects database and the VR scene database for use in other VR content generation processes. The stored VR information may be associated with various metadata related to the content of the generated VR information including all objects, persons, landmarks, scenes, environment conditions, and the like, within the content, as well as the original content corresponding to the generated VR content.

The VR content may also be generated to include all or some of the metadata identified, generated, or collected during the generation of the VR content. For example, if a particular actor is identified in the original content and the VR content includes a VR representation of the particular actor, the VR content may include metadata of the actor within the generated content information.

In yet other embodiments, various objects, persons, landmarks, and the like within the generated VR content may be actionable by viewer to activate and view the associated metadata. In such embodiments, a VR representation of the particular identified actor may be clickable or otherwise selectable within the VR space in order to view the metadata associated with the particular actor. The VR content may also be generated to include feedback instructions to be performed, such as by providing tactile or haptic feedback, and the like, in response to an action or interaction with a user. In other embodiments, the associated metadata may not be directly displayed to a user, but the metadata may be used to connect to external information sources, such as stored databases or the internet, to search for and retrieve information related to the particular actor based on the stored metadata in the generated VR content.

In some embodiments, the VR generator 103 may comprise one or more software or hardware computer systems. In an embodiment the VR generator may comprise or be operably coupled to one or more hardware memory systems for storing information including databases for storing, accessing, and querying various content and characteristics information. The one or more computer systems of the VR generator 103 may include one or more computer processors or controllers configured to process information, generate controlling commands, and the like. In one embodiment, the VR content analyzer and the VR synthesizer may each comprise a processor of the computer system, and in other embodiments a single processor may be configured to perform the associated functions. The various computer systems, memory, and components of the system 100 may be operably coupled to communicate information, and the system may further include various hardware and software communication modules and circuitry to enable wired or wireless communication of information.

Turning now to FIG. 2, an aspect of the content analyzer 202 of the VR generating system 200 is shown. As previously discussed with respect to FIG. 1, the original content DB 101 or other content source may provide original content in the form of traditional 2D video, 2D multiview content, 3D video content, or the like, as discussed. The content analyzer 202 may include various components, including object recognition 203, audio recognition 204, and text extraction 205 components.

The object recognition component 203 may receive video or images of the original content and perform object detection and recognition processes in order to recognize various objects, landmarks, faces, and the like, depicted in the original content. The object recognition information is then passed to an object analyzer component 208 which generates a query based on the object recognition information to perform identification processes and retrieve additional related information stored in the object characteristics database 206, as previously discussed.

As an example, the object recognition component 203 may analyze the original content and detect a face in the original content. The object analyzer 208 may query the object characteristics database 206 with metadata of the detected face, wherein the query incorporates various metadata of the particular face. The object analyzer 208 may also be configured to query various other information sources to obtain identifying information of the particular face. In one example, the object analyzer 208 may query information provided by a third party, such as an image repository connected via a network such as the internet. In response to the query, the object analyzer 208 may receive identifying information of a particular actor corresponding to the recognized face of the original content. The object characteristics database 206 may also include stored information associated with metadata of the particular actor, including images or other video content depicting the actor's face from various angles.

In such an example, 2D video content stored in the object characteristics database 206 may be associated with metadata of the name of the actor and may include an actor turning his or her head to one side in a one-second 2D video clip. The video clip may have been created for use in separate unrelated media, or in other embodiments it may have been created specifically to populate the object characteristics database 206. Further in the example, if the one-second video clip is originally shot in 48 frames-per-second format, the stored information may provide up to 48 individual video frame images of the actor's head and face from varying angles, thereby providing additional three-dimensional information for mapping the actor's face and head in the generation of the VR content.

In an embodiment, the system also includes a VR scene database 212 and VR object database 213. The VR scene database 212 may be configured to store VR content information related to complete scenes which may be used and incorporated into the generation of new VR content. The VR objects database 213 may be configured to store VR content information related to specific and identified objects which are extracted and may be incorporated into the generation of new VR content. The object analyzer 208 may also query the VR scene database 212 and the VR object database 213 for existing VR content which corresponds to the identified objects, people, locations environments, and the like, of the original content. The query to the VR scene database 212 and the VR object database 213 may include the same or similar metadata information as the query to the object characteristics database 206 and the sound characteristics database 207 as previously discussed.

The audio recognition component 204 may receive audio of the original content and perform audio recognition processes in order to recognize various speech, voices, noises, and sounds included in the original content. The audio recognition information is then passed to an audio analyzer component 209 which generates a query based on the audio recognition information to retrieve additional related information stored in a sound characteristics database 207. In some embodiments, the audio recognition component 204 may be configured to extract specific audio characteristics and perform recognition using a database of previously collected and stored audio characteristics, or may be configured to query third party sources such as an audio clip repository connected via a network, such as the internet, as similarly discussed above with respect to the object recognition component 203. Using the recognition information, the audio analyzer 209 may query the sound characteristics database 207 to identify certain objects, features, conditions, people, and the like, included in the original content. In some embodiments, the audio analyzer 209 may also be configured to query the VR scene database 212 and the VR object database 213 for existing VR content related to the recognition information, similar to the query previously discussed with respect to queries generated by the object analyzer 208.

For example, as previously discussed, the distinctive acoustic fingerprint of a helicopter rotor sound may be used by the audio analyzer to match with an acoustic fingerprint or other identifying audio information of a helicopter stored in the sound characteristics database 207. In another example, a voice may be recognized by the audio recognition component 204, and the audio analyzer may query the sound characteristics database 207 to match the recognized voice with voice information stored in the database in order to identify the particular actor or person. Thus, the audio analyzer 209 may also provide the object analyzer 208 with additional information—by identifying audio of people, objects, and the like—to perform object analysis in order to generate an accurate metadata query for additional stored information from the object characteristics database 206.

In other embodiments, the audio recognition component 204 may provide context information for particular objects to be generated in the VR format. For example, the audio recognition component 204 may detect that the audio of the helicopter provided in multi-channel audio indicates that the helicopter is flying through a scene in a left to right direction. Based on this recognized information, the audio analyzer may generate context information for generating the VR scene to compile a virtual representation of its position, speed, and direction within the virtual space.

Additionally, information of the identified helicopter may be retrieved and included in the generated VR content even where the original content does not include a visual depiction of the helicopter. For example, in a scene of the original content, the rotor sound of a helicopter may be heard just off screen, but no depiction of the actual helicopter may be included. Based on the audio information as previously discussed, the helicopter, as well as its position with respect to the viewer of the original content may be identified. The information provided by the audio analyzer may be used by the object analyzer to retrieve images or video of the identified helicopter stored in the object characteristics database 206, VR scene database 212, or VR object database 213 to be mapped to the audio of the original content and used in generating 360 degree VR content which includes a view of the helicopter when the VR viewer is turned in the identified direction of the helicopter. In some embodiments, the information obtained from the audio recognition component 204 may provide environmental information in addition to the context information for particular scenes to be generated in the VR format by providing a full 360 degree VR experience to a viewer. For example, the audio recognition component 204 may detect sounds recognized as crashing waves along a shore. Based on the recognized audio information, the audio analyzer 209 may provide information to the object analyzer 208 and the context analyzer 211 that the VR scene to be generated involves a coast or beach environment. The information from the audio recognition component 204 may be implemented to inform various other environmental conditions, such as flashes, rain, wind, traffic, indoors, outdoors, nighttime, daytime, morning, and the like. The context analyzer 211 may use the information related to a coast or beach environment to retrieve existing information stored in the object characteristics database 206, sound characteristics database 207, VR scene database 212, or VR object database 213 associated with a coast or beach environment to provide the VR synthesizer with environment information to generate the VR content.

Therefore, the context analyzer may retrieve additional stored content indicated by objects, environments, settings, and the like which are provided by audio, video, and text of the original content in order to retrieve additional stored content to complete the 360 degree VR content, where the original content, such as traditional 2D original content for example, does not include such information.

Referring back to the example of FIG. 4, the context analyzer 211 may obtain information of the Statue of Liberty 401 depicted in the original content 400. Based on this information, the context analyzer 211 may identify that the scene context is based in New York and may retrieve additional stored information associated with New York metadata, as well as specific image, sound, and object information stored in the object characteristics database 206, sound characteristics database 207, VR scene database 212, or VR object database 213 to retrieve the information needed to generate a full 360 degree view of the Statue of Liberty area indicated by the original content 400. The retrieved information may include environmental or object information of the Statue of Liberty area that was created and used for other media content, or that was created specifically to collect video and audio information for later use by the VR generator. Thus, the context analyzer 211 retrieves information not included in the original content 400 in order to identify sufficient information needed to generate VR content capable of providing a 360 degree view to a viewer based on the original content, although the original content may only include information for a single viewing angle in the environment.

Additionally, a text extraction component 205 may be included in the content analyzer 202 to extract text information from the original content. Extracted text from the original content may include subtitles, closed captioning content, actual text depicted within the original content, and the like. The extracted text may be provided to the text analyzer 210. Additionally, the text analyzer 210 may receive text information from the audio recognition component 204 resulting from speech-to-text recognition performed by the audio recognition component. The text analyzer 210 may process the extracted text information to provide additional object, context, or environmental information similar to that as previously discussed with respect to the audio analyzer 209.

For example, if extracted text information indicates that a particular scene of the original content occurs in a restaurant (i.e., speech-to-text information is received of characters ordering from a menu), the text analyzer 210 may provide environment context information to the context analyzer 211 to inform that the VR scene is to be generated within a restaurant setting. In some embodiments, the text analyzer may also provide the environment context information to the audio analyzer 209 and the object analyzer 208. This environment context information may contribute to improving efficiency when generating informed queries to the object characteristics database 206 and the sound characteristics database 207.

Additionally, the context analyzer 211 may receive the information generated and retrieved by the object analyzer 208, audio analyzer 209, and the text analyzer 210 to generate additional features of the generated VR content based on the environment and context of the original source content. For example, the context analyzer 211 may determine that a particular scene occurs in a beach setting, and may query the object characteristics database 206, sound characteristics database 207, VR scene database 212, and VR object database 213 to retrieve additional information to generate a complete scene in the generated VR content. Thus, in addition to images and video to generate the visual aspects of the VR content, the context analyzer may also retrieve audio information such as ambient sounds such as background seagull sounds, a sound of crashing waves along a shore, a background sound of a bell being rung from a nearby boat, and the like. The context images, video, audio, and other information may thus be retrieved and output by the context analyzer 211 for generation of the VR content.

Various embodiments of the system 200 may further comprise additional aspects which have been omitted for the purposes of the discussion of FIG. 2, and it will be understood by those of ordinary skill in the art that all combinations of aspects of the system are considered including a VR features database, VR synthesizer, and the like, as discussed with respect to the examples of FIG. 1. Additionally, it will be understood that this disclosure considers embodiments of a system for generating VR content wherein the system includes all of the components depicted and discussed herein, including a system having hardware or software components implemented together, or separated and connected by known networking and communication methods and techniques.

As previously discussed, in some embodiments the content analyzer 202 of the system 200 may comprise one or more software or hardware computer systems and may further comprise or be operably coupled to one or more hardware memory systems for storing information including databases for storing, accessing, and querying various content and characteristics information. In hardware implementations, the one or more computer systems incorporate one or more computer processors and controllers.

The components of the various embodiments discussed herein may each comprise a hardware processor of the one or more computer systems, and in one embodiment a single processor may be configured to implement the various components. For example, in one embodiment, the object analyzer 208, audio analyzer 209, and text analyzer 210 may be implemented as separate hardware systems, or may be implemented as a single hardware system. The hardware system may include various transitory and non-transitory memory for storing information, wired and wireless communication receivers and transmitters, displays, and input and output interfaces and devices. The various computer systems, memory, and components of the system 200 may be operably coupled to communicate information, and the system may further include various hardware and software communication modules, interfaces, and circuitry to enable wired or wireless communication of information.

Figure 3:
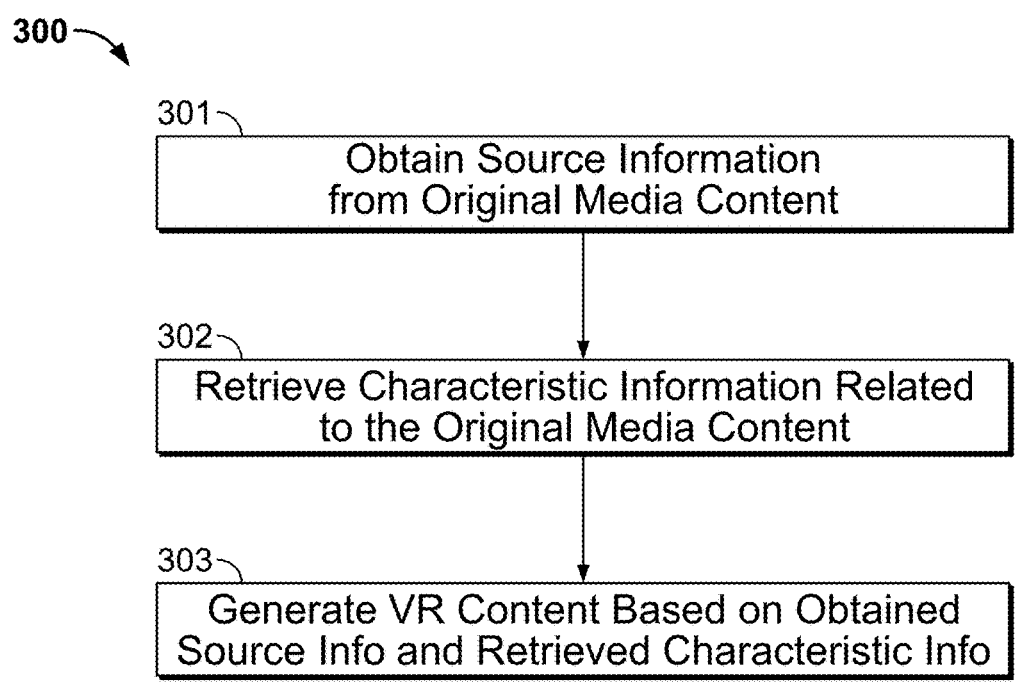
FIG. 3 is an illustration of a method for generating VR content in accordance with an embodiment of the present disclosure.

Turning now to FIG. 3, the figure shows a flowchart including operations of a method 300 of an embodiment of the present disclosure for generating VR content. The method 300 includes an operation block at 301 of obtaining source information from the original media content, including the object recognition information, audio recognition information, and extracted text information by the content analyzer as discussed above with reference to FIG. 2. The source information may also include metadata of the identified objects, people, landmarks, environment conditions, and the like, analyzed by the object analyzer, audio analyzer, and text analyzer as discussed above with respect to the example of FIG. 2.

The method 300 further includes retrieving characteristic information related to the original media content content at block 302. This operation may include querying the characteristics database, or separate object characteristics database and sound characteristics database as discussed above with respect to the example of FIG. 2. The retrieved characteristic information may include additional stored information such as video or images of a recognized object, person, landmark, and the like included in the original media content. In one example, the retrieved characteristic information may include a video clip showing the Statue of Liberty from multiple viewing angles, or a number of images of the Statue of Liberty from multiple viewing angles.

In another example, the retrieved characteristic information may include identifying information of a recognized object, such as model information of a helicopter identified using an acoustic fingerprint of the rotor audio obtained from the original media content. In such examples, the retrieved characteristic information is related to the original media content and includes additional stored information of the original media content to enable generation of VR content.

The method 300 further includes an operation of generating VR content based on the obtained source information and the retrieved characteristic information at block 303. Generating the VR content may include 3D mapping of an object or a face included in the original media content content based on the retrieved characteristic information, where the characteristic information provides additional stored information of the object or face of varying viewpoints, thereby providing sufficient information for 3D mapping.

Generating the VR content may also include incorporating detected information of the original media content, such as determining the position of a particular person or object within the generated VR space based on directional multi-channel audio information associated with the person or object, or based on text information indicating a relative position of the person or object.

In another embodiment, the method may further include retrieving stored 3D information based on the source information. For example, the stored 3D information may include previously generated or created 3D or VR content of a recognized object or person included in the original media content. In such an embodiment, the operation of generating the VR content shown at block 303 may include generating the VR content based on the stored 3D information, the source information, and the retrieved characteristic information. The method 300 may also include outputting the generated VR content to be reproduced to a viewer (not depicted). The original content may also be output in addition to the generated VR content to be reproduced to a viewer.

According to embodiments of the present invention, a system for generating VR content may include one or more computer systems, computer processors, storage devices, distribution channels, etc., in order to analyze the original content, retrieve related characteristic information, and generate the VR content based on the original content and the retrieved characteristic information. Portions of the original content, object characteristic information, audio characteristic information, and VR features information may reside in different locations, or may be distributed widely and coordinated with one another, particularly in a large organization. Moreover, particular portions may reside in entirely separate environments, such as content creators, content distributors, and the like.

Various embodiments described herein may be implemented in a computer-readable non-transitory medium, a machine-readable medium, or similar medium using, for example, software, hardware, or any combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In some cases, such embodiments are implemented by a controller or a processor. In all embodiments, the various components described herein may be implemented as a single component, or alternatively may be implemented in various separate components.

The various devices, modules, terminals, and the like discussed herein may be implemented on a computer by execution of software comprising machine instructions read from computer-readable medium. These hardware aspects may further include an input/output interface, graphical user interface, or other input/output means to allow the input/output of information related to controlling functions, inputting information, outputting information, receiving information, or transmitting information. In certain embodiments, several hardware aspects may be implemented using a single computer, in other embodiments multiple computers, input/output systems and hardware may be used to implement the system.

For a software implementation, certain embodiments described herein may be implemented with separate software modules, such as procedures and functions, each of which perform one or more of the functions and operations described herein. The software codes can be implemented with a software application written in any suitable programming language and may be stored in memory and executed by a controller or processor.

The foregoing disclosed embodiments and features are merely exemplary and are not to be construed as limiting the present invention. The present teachings can be readily applied to other types of apparatuses and processes. The description of such embodiments is intended to be illustrative, and not to limit the scope of the claims. Many alternatives, modifications, and variations will be apparent to those skilled in the art.

What is claimed is:

1. A method for generating virtual reality (VR) content, the method comprising:
   identifying an element in original media content;
   generating a VR representation of the identified element based on one or more images of the identified element such that the generated VR representation includes visual 3D information of the identified element;
   generating VR content corresponding to the original media content wherein the VR content includes the VR representation of the identified element, wherein the generating the VR content comprises determining a position of the VR representation within the VR content based on directional audio information associated with the identified element from the original media content; and outputting the VR content corresponding to the original media content.

2. The method of claim 1, further comprising determining a movement of the VR representation of the identified element to be depicted within the VR content based on the directional audio information, wherein outputting the VR content comprises displaying the movement of the VR representation within the VR content based on the directional audio information.

3. The method of claim 2, further comprising determining a speed of the movement of the VR representation of the identified element to be depicted within the VR content based on the directional audio information, wherein outputting the VR content comprises displaying the speed of the movement of the VR representation within the VR content based on the directional audio information.

4. The method of claim 1, further comprising searching for images of the identified element using metadata of the identified element and receiving the one or more images of the identified element in response to the search.

5. The method of claim 1, wherein at least one image of the one or more images is mapped to at least one viewing angle of the visual 3D information of the identified element.

6. The method of claim 1, wherein the identified element is identified by matching an image of a frame of video of the original media content to image information associated with the identified element.

7. The method of claim 1, wherein the identified element is identified by matching audio from the original media content to audio information associated with the identified element.

8. The method of claim 7, wherein the identified element is not visually depicted in the original media content.

9. The method of claim 1, wherein the identified element corresponds to a particular person in the original media content.

10. The method of claim 9, wherein the particular person is identified by matching voice audio from the original media content to voice information associated with the particular person.

11. The method of claim 9, wherein the particular person is identified by matching an image of a face from the original media content with facial recognition information associated with the particular person.

12. The method of claim 1, wherein the VR content comprises at least one of 360 degree imagery of a scene or 3D content.

13. A virtual reality (VR) content generating system comprising:
at least one controller configured to:
identify an element in original media content;
generate a VR representation of the identified element based on one or more images of the identified element such that the generated VR representation includes visual 3D information of the identified element;
generate VR content corresponding to the original media content wherein the VR content includes the VR representation of the identified element, wherein generating the VR content comprises determining a position of the VR representation within the VR content based on directional audio information associated with the identified element from the original media content; and
output the VR content corresponding to the original media content.

14. The system of claim 13 further comprising a VR display wherein the at least one controller is further configured to:
determine a movement of the VR representation of the identified element to be depicted within the VR content based on the directional audio information; and
output the VR content by causing the VR display to display the movement of the VR representation within the VR content based on the directional audio information.

15. The system of claim 14, wherein the at least one controller is further configured to:
determine a speed of the movement of the VR representation of the identified element to be depicted within the VR content based on the directional audio information; and
output the VR content by causing the VR display to display the speed of the movement of the VR representation within the VR content based on the directional audio information.

16. The system of claim 13, wherein the at least one controller is further configured to search for images of the identified element using metadata of the identified element and receive via a communication interface the one or more images of the identified element in response to the search.

17. The system of claim 13, wherein the at least one controller is further configured to map at least one image of the one or more images to at least one viewing angle of the visual 3D information of the identified element.

18. The system of claim 13, wherein the at least one controller is further configured to identify the identified element by matching an image of a frame of video of the original media content to image information associated with the identified element.

19. The system of claim 13, wherein the at least one controller is further configured to identify the identified element by matching audio from the original media content to audio information associated with the identified element, and wherein the identified element is not visually depicted in the original media content.

20. The system of claim 13, wherein the identified element corresponds to a particular person in the original media content, and wherein the at least one controller is further configured to:
identify the particular person by matching voice audio from the original media content to voice information associated with the particular person; or
identify the particular person by matching an image of a face from the original media content with facial recognition information associated with the particular person.

21. The system of claim 13, wherein the VR content comprises at least one of 360 degree imagery of a scene or 3D content.

22. A machine-readable non-transitory medium having stored thereon machine-executable instructions for:
identifying an element in original media content;
generating a VR representation of the identified element based on one or more images of the identified element such that the generated VR representation includes visual 3D information of the identified element;
generating VR content corresponding to the original media content wherein the VR content includes the VR representation of the identified element, wherein the generating the VR content comprises determining a position of the VR representation within the VR content based on directional audio information associated with the identified element from the original media content; and outputting the VR content corresponding to the original media content.

* * * * *